(12) United States Patent
Hayashi et al.

(10) Patent No.: US 6,658,952 B2
(45) Date of Patent: Dec. 9, 2003

(54) SHIFT DEVICE

(75) Inventors: Masaki Hayashi, Aichi (JP); Naoki Kamiya, Aichi (JP); Chikao Nagasaka, Aichi (JP); Yoshimasa Kunimatsu, Aichi (JP); Toru Nakamura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 35 days.

(21) Appl. No.: 10/087,666

(22) Filed: Mar. 1, 2002

(65) Prior Publication Data

US 2002/0157492 A1 Oct. 31, 2002

(30) Foreign Application Priority Data

Mar. 1, 2001 (JP) ........................................ 2001-057302

(51) Int. Cl.$^7$ ........................... F26H 59/00; F26H 61/00
(52) U.S. Cl. .................. 74/336 R; 74/473.12; 74/473.21
(58) Field of Search ...................... 74/473.21, 473.12, 74/473.33, 336 R; 477/125, 906

(56) References Cited

U.S. PATENT DOCUMENTS

| | | | | |
|---|---|---|---|---|
| 4,079,638 A | * | 3/1978 | Sibeud | 74/336 R |
| 4,463,427 A | * | 7/1984 | Bonnetain et al. | 477/125 |
| 4,495,457 A | * | 1/1985 | Stahl | 477/125 |
| 4,922,769 A | * | 5/1990 | Tury | 477/906 |
| 5,416,698 A | * | 5/1995 | Hutshison | 74/336 R |
| 5,545,108 A | * | 8/1996 | Wagner et al. | 477/125 |

* cited by examiner

*Primary Examiner*—Dirk Wright
(74) *Attorney, Agent, or Firm*—Patterson, Thuente, Skaar & Christensen, P.A.

(57) ABSTRACT

A shift device that prevents an operator from unintentionally operating the shift lever. The shift device has a plurality of shift ranges and sets a predetermined range from the plurality of shift ranges. The shift device includes a shift lever for setting the predetermined shift range, a control circuit, and a notification device. The control circuit determines whether an operator has unintentionally operated the shift lever. The notification device notifies the operator that the operator has unintentionally operated the shift lever in accordance with the determination of the control circuit.

10 Claims, 4 Drawing Sheets

SHIFT DEVICE

BACKGROUND OF THE INVENTION

The present invention is related to a shift device, and more particularly to a shift device that is provided in a vehicle and prevents a shift lever from being operated unintentionally by the driver.

A shift-by-wire type shift device, which shifts to a desired range just by simply operating a shift lever, is known in the prior art. The conventional shift device increases driving maneuverability. However, the increased maneuverability may result in the driver operating and shifting the shift lever unintentionally.

SUMMARY OF THE INVENTION

It is an object of the present invention to provide a shift device that prevents a shift lever from being operated unintentionally by the driver.

To achieve the above object, in one perspective of the present invention, a shift device having a plurality of shift ranges and setting a predetermined range from the plurality of shift ranges is provided. The shift device includes a shift lever for setting the predetermined shift range. A control circuit is connected to the shift lever to determine whether an operator has unintentionally operated the shift lever. A notification device is connected to the control circuit to notify the operator that the operator has unintentionally operated the shift lever in accordance with the determination of the control circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
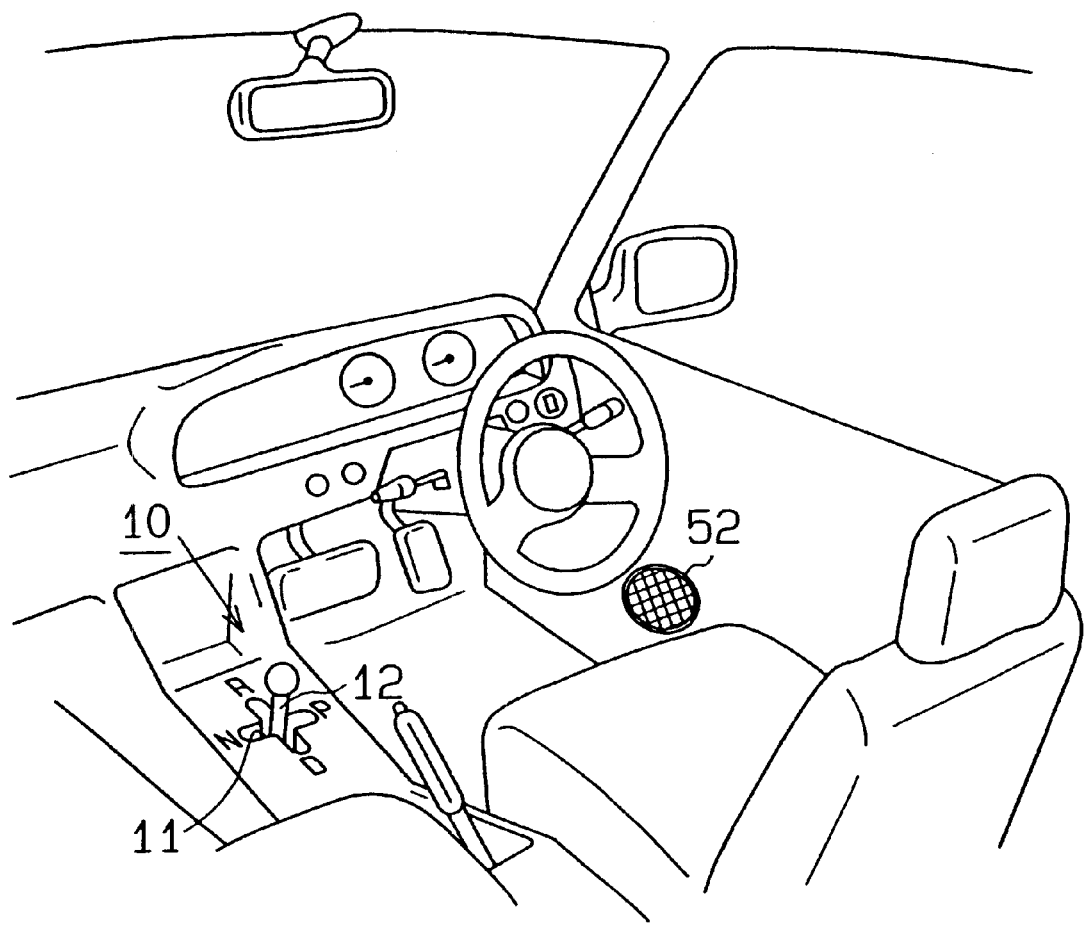
FIG. 1 is an explanation view showing the interior of a vehicle in which a shift device according to a preferred embodiment of the present invention is provided.

FIG. 1 is an explanatory diagram showing the interior of a vehicle in which a shift device 10 according to a preferred embodiment of the present invention is provided.

As shown in FIG. 1, the shift-by-wire type shift device 10 is arranged on a center console panel between the driver's seat and the passenger's seat. The shift device 10 includes a cross-like shift gate 11 and a shift lever 12, which projects from the shift gate 11.

When the driver moves the shift lever 12 to "R (rear range)," the shift lever 12 is temporarily positioned in "R" and then returns to the intersection of the shift gate 11. The shift device 10 of the preferred embodiment is a momentary type. In this state, the vehicle is driven backward.

When the shift lever 12 is moved to "P (parking range)", "D (drive range)" or "N (neutral range)", the shift lever 12 is temporarily positioned in "P", "D" or "N" and then returned to the intersection of the shift gate 11. When the shift lever 12 is moved to "D", the vehicle is automatically shifted between four gear connecting states (four steps of D1–D4) that have different gear ratios in accordance with the state of the traveling vehicle.

Figure 2A:
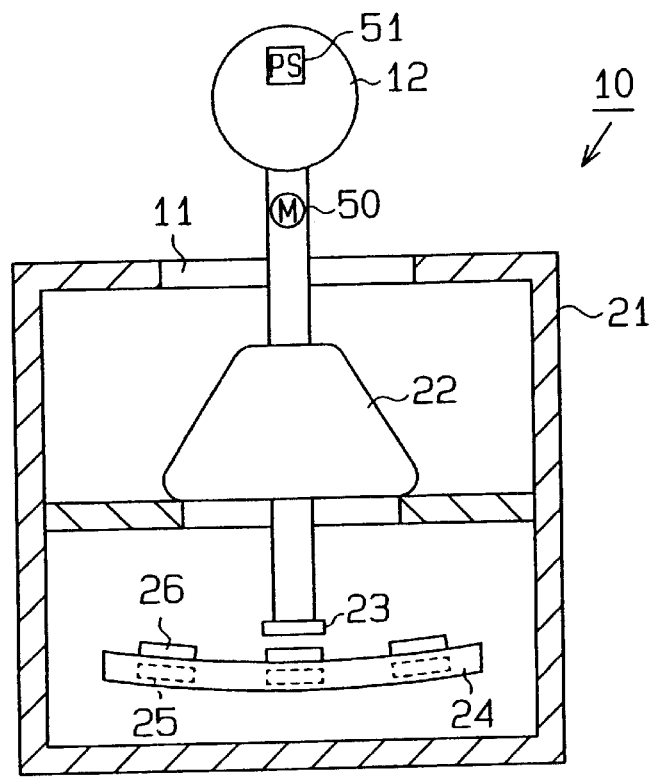
FIG. 2A is a schematic cross sectional view of the shift device according to the preferred embodiment of the present invention.

FIG. 2A is cross sectional view of the shift device 10. As shown in FIG. 2A, the shift lever 12 of the shift device is supported by a support portion 22, which is provided in a main body 21. A permanent magnet 23 is provided at the lower end of the shift lever 12. When the shift lever 12 is moved, the permanent magnet 23 moves in a direction opposite to the moving direction of the shift lever 12 with the support portion 22 serving as a fulcrum. An elastic member is arranged in the support portion 22 to return the shift lever 12 to the intersection of the shift gate 11 after the shift lever 12 is moved.

A plate 24 is arranged in the vicinity of the permanent magnet 23 of the shift lever in the main body 21. The plate 24 is curved in correspondence with a path along which the permanent magnet 23 moves.

Figure 2B:
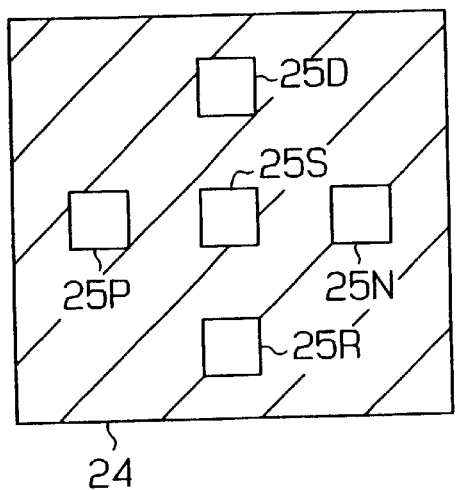
FIG. 2B is a plan view showing the arrangement of electromagnets of the shift device of FIG. 2A.

As shown in FIGS. 2A and 2B, five electromagnets 25 are embedded in the plate 24. Each electromagnet (25D, 25N, 25R, 25P, 25S) faces the permanent magnet 23 of the shift lever 12 when the shift lever 12 is operated. Each electromagnet is excited when the engine is started.

Figure 2C:
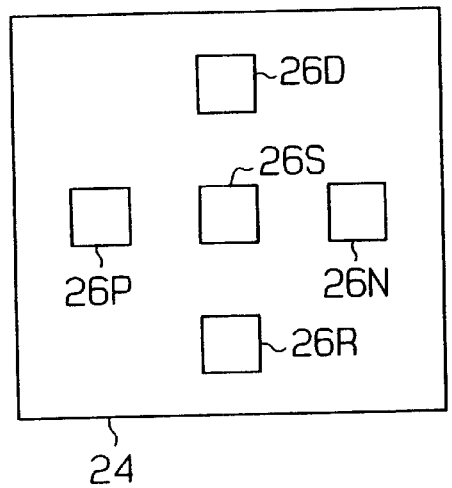
FIG. 2C is a plan view showing the arrangement of magnetic sensors of the shift device of FIG. 2A.

As shown in FIGS. 2A and 2C, five magnetic sensors 26 are arranged on the plate 24, each facing an associated one of the five electromagnets 25. Each magnetic sensor (26D, 26N, 26R, 26P, 26S) detects the position of the permanent magnet 23 when the shift lever 12 is operated.

Figure 3:
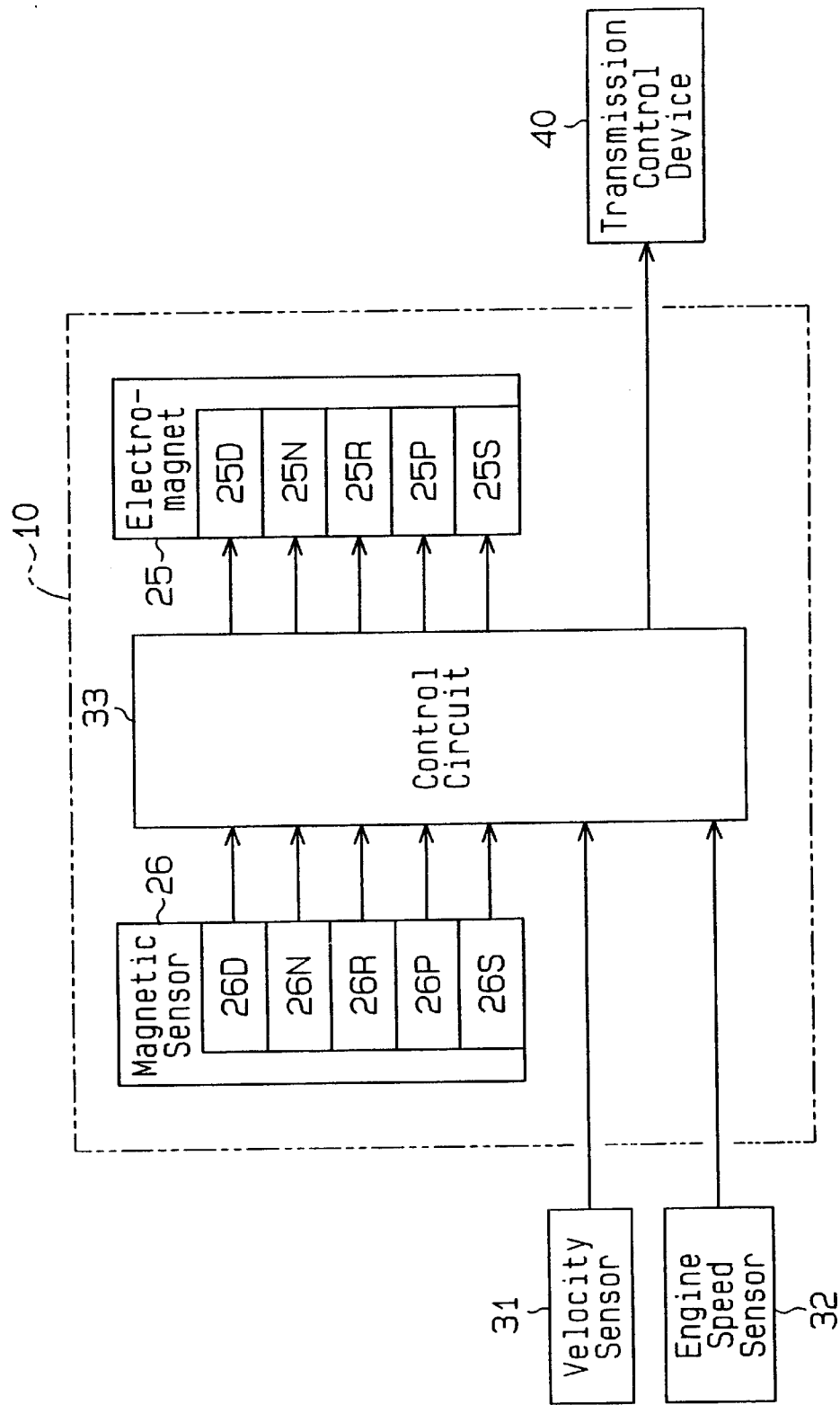
FIG. 3 is a schematic electric block diagram of the shift device of FIG. 2A.

FIG. 3 is a schematic electric block diagram of the shift device 10. As shown in FIG. 3, the shift device 10 includes the five electromagnets 25, the five magnetic sensors 26, a velocity sensor 31, an engine speed sensor 32, and a control circuit 33.

Each magnetic sensor (26D, 26N, 26R, 26P, 26S) detects the position of the permanent magnet 23, which moves when the shift lever 12 is operated, generates a position signal, and provides the position signal to the control circuit 33.

The velocity sensor 31 detects the vehicle velocity, generates a velocity signal, and provides the velocity signal to the control circuit 33. The engine speed sensor 32 detects the engine speed and provides an engine speed signal to the control circuit 33.

The control circuit 33 controls an exciting current for exciting each electromagnet 25 in accordance with the position signal, the velocity signal, and the engine speed signal. The control circuit 33 determines whether the operation of the shift lever 12 is valid or invalid from the position signal, the velocity signal and the engine speed signal and generates a determination signal. The determination signal is provided to a transmission control device 40.

The transmission control device 40 controls a transmission in accordance with the determination signal. When the operation of the shift lever is valid, the transmission control device 40 shifts the connection of the transmission. When the operation of the shift lever 12 is invalid, the transmission control device 40 does not shift the connection of the transmission and maintains the present connection.

Figure 4:
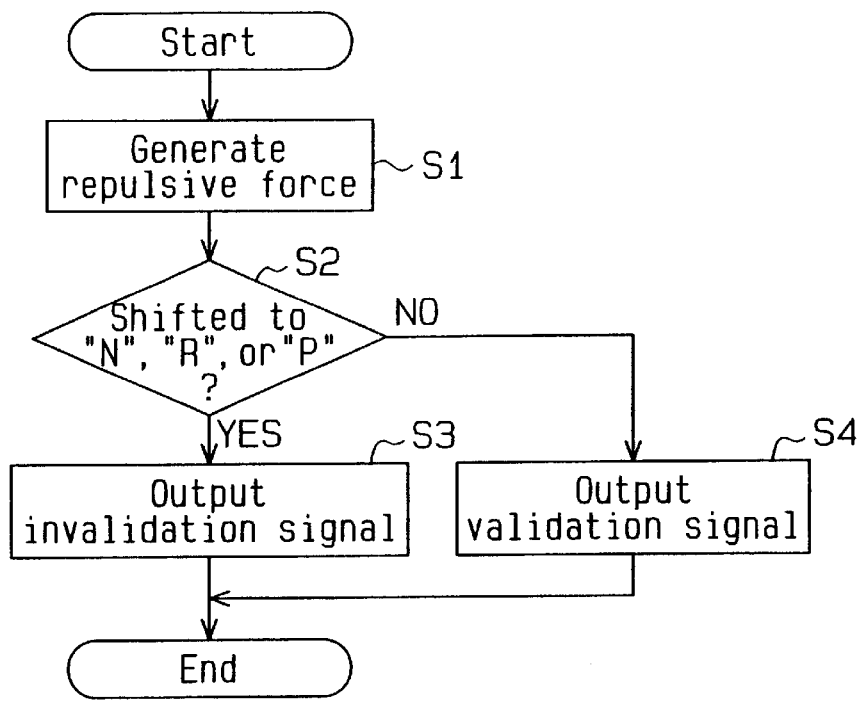
FIG. 4 is a flowchart illustrating the operation of the shift device when the vehicle is traveling.
Figure 5:
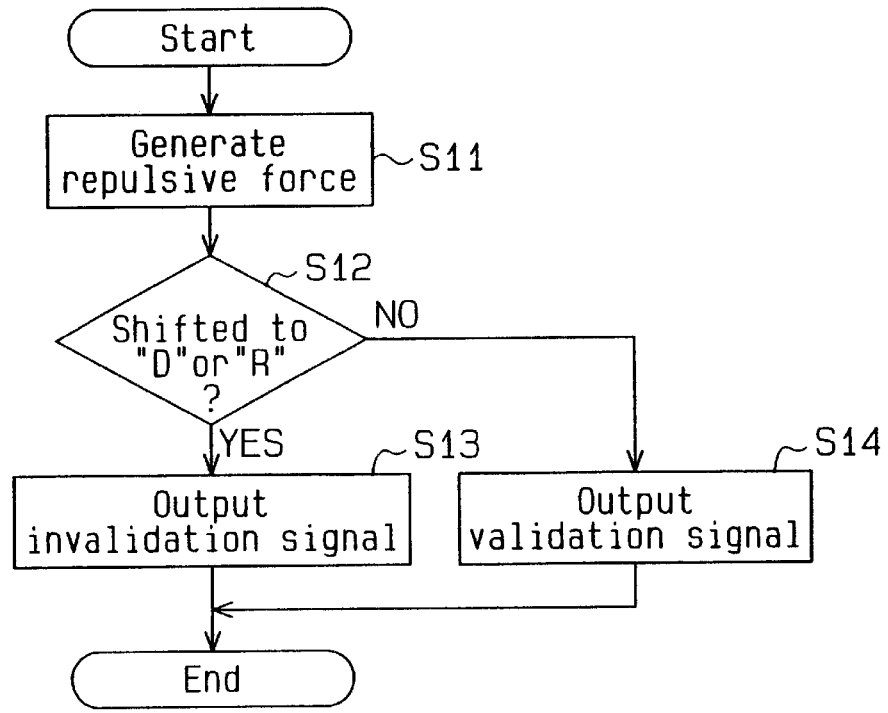
FIG. 5 is a flowchart illustrating the operation of the shift device when the engine speed of the vehicle is greater than or equal to a predetermined speed.

FIGS. 4 and 5 are flowcharts illustrating the operating procedure of the shift device 10.

[1] Case in which the shift lever 12 is set in the "D" range and the control circuit 33 determines from the velocity signal that the vehicle is traveling at a velocity that is greater than or equal to a predetermined velocity (e.g., 2 km/h)

As shown in FIG. 4, in step S1, the control circuit 33 generates the exciting current, which magnetizes the electromagnets 25N, 25R, 25P to a polarity that is the same as that of the permanent magnet 23, in accordance with the position signal from the magnetic sensor 26D and supplies the electromagnets 25N, 25R, 25P with the generated exciting current. Therefore, a repulsive force is generated between the permanent magnet 23 and the electromagnets 25N, 25R, 25P. Thus, even if the driver tries to move the shift lever 12 to the "N" range, the "R" range, or the "P" range, the resistance resulting from the repulsive force makes it difficult to move the shift lever 12.

In step S2, the control circuit 33 determines whether the shift lever 12 has been shifted to the "N" range, the "R" range or the "P" range against the repulsive force. When determining that the shift lever 12 has been shifted against the repulsive force, the control circuit 33 proceeds to step S3. When determining that the shift lever 12 has not been shifted, the control circuit 33 proceeds to step S4. The control circuit 33, for example, has a memory (not shown) for storing information of the presently magnetized electromagnet and compares the stored information and the position signal from the magnetic sensor 26 to determine whether the shift lever 12 has been shifted against the repulsive force.

In step S3, the control circuit 33 generates an invalidation signal and provides the invalidation signal to the transmission control device 40. Even if the shift lever 12 is shifted to the "N" range, "R" range or the "P" range against the repulsive force generated between the permanent magnet 23 and the electromagnet 25N, 25R, 25P when the vehicle is traveling, the operation of the shift lever 12 is invalid. In accordance with the invalidation signal, the transmission control device 40 does not shift the transmission and maintains the present connecting state (the "D" range) of the transmission. Therefore, the shift lever 12 is prevented from being unintentionally operated.

In step S4, the control circuit 33 generates a validation signal and provides the validation signal to the transmission control device 40. For example, when the shift lever 12 is moved again to the "D" range, the transmission control device 40 performs a process to shift the connection of the transmission in accordance with the validation signal. Actually, since the shifting is from the "D" range to the "D" range in this case, the present connection (the "D" range) of the transmission is maintained.

[2] Case in which the shift lever 12 is set at the "N" range or the "P" range and the control circuit 33 determines from the engine speed detection signal that the engine speed is greater than or equal to a predetermined engine speed (e.g. 2000 rpm)

As shown in FIG. 5, in step S11, the control circuit 33 generates the exciting current, which magnetizes the electromagnets 25D, 25R to a polarity that is the same as that of the permanent magnet 23, in accordance with the position signal from the magnetic sensors 26N, 26P and supplies the electromagnets 25D, 25R with the generated exciting current. Therefore, a repulsive force is generated between the permanent magnet 23 and the electromagnets 25D, 25R. Thus, even if the driver tries to move the shift lever 12 to the "D" range or the "R" range in this state, the "R" range, or the "P" range, the resistance resulting from the repulsive force makes it difficult to move the shift lever 12.

In step S12, the control circuit 33 determines whether the shift lever 12 has been shifted to the "D" range or the "R" range against the repulsive force. When determining that the shift lever 12 has been shifted, the control circuit 33 proceeds to step S13. When determining that the shift lever 12 has not been shifted against the repulsive force, the control circuit 33 proceeds to step S14.

In step S13, the control circuit 33 generates an invalidation signal and provides the invalidation signal to the transmission control device 40. Even if the shift lever 12 is shifted to the "D" range or the "R" range against the repulsive force generated between the permanent magnet 23 and the electromagnets 25D, 25R, the operation of the shift lever 12 is invalid when the engine speed is greater than or equal to the predetermined engine speed. In accordance with the invalidation signal, the transmission control device 40 does not shift the transmission and maintains the present connection (the "N" range or the "P" range) of the transmission. Therefore, since the shift lever 12 is prevented from being unintentionally operated, sudden movement of the vehicle is prevented.

In step S14, the control circuit 33 generates a validation signal and provides the validation signal to the transmission control device 40. The transmission control device 40 shifts the connection of the transmission in accordance with the validation signal. More specifically, even when the engine speed is greater than or equal to the predetermined engine speed, it is determined that shifting from the "N" range to the "P" range or from the "P" range to the "N" range is valid.

The shift device 10 of the preferred embodiment has the following advantages.

(1) The control circuit 33 supplies the electromagnets 25 with the exciting current so that the polarity of the electromagnets 25 is the same as that of the permanent magnet 23. In this state, the repulsive force is generated between the permanent magnet 23 and the electromagnets 25 that are related to ranges to where the shift lever 12 should not be moved. Due to the repulsive force, the driver can easily and certainly confirm operations of the shift lever 12 that are not intentional. Accordingly, the shift lever 12 is prevented from being unintentionally operated.

(2) Even when the shift lever 12 is moved against the restraining force applied to the shift lever 12, the transmission control device 40 does not shift the connection of the transmission and maintains the present connection in accordance with the invalidation signal from the control circuit 33. Accordingly, the prevention of unintentional operation of the shift lever 12 is guaranteed and safety is ensured when the vehicle is traveling.

The preferred embodiment may also be modified as described below.

The preferred embodiment may be applied to a shift device that shifts the shift lever 12 from the "R" range to the "D" range under the condition that a brake pedal is first depressed.

When the operation of the shift lever 12 is an unintentional one, a warning of the unintentional operation may be given by vibrating the shift lever 12. More specifically, for example, as shown in FIG. 2A, a motor 50 may be installed in the shift lever 12. The motor 50 vibrates to give a warning of an unintentional operation of the shift lever 12.

A notification of the present range of the shift lever 12 may be given through vibrations of the shift lever 12 or through a voice. More specifically, for example, as shown in FIG. 2A, a pressure sensor 51 is arranged on the shift lever 12 and the motor 50 is installed in the shift lever 12. When the driver's hand touches the shift lever 12, the driver may recognize the present range through the number of times produced by the motor 50 or through a voice from a speaker 52, which is shown in FIG. 1. The recognition of the present range prevents unintentional operation of the shift lever 12. A notification of the present range may constantly be given through vibrations and not just when the driver's hand touches the shift lever 12.

When the shift lever 12 is set to the "D" range and the driver's hand touches the shift lever 12, vibrations differing for each gear of the "D" range may be generated in accordance with a detection signal from the pressure sensor 51. More specifically, for example, when the "D" range is set in the third speed, the shift lever 12 may be vibrated three times. In this state, a notification of the present gear may be given through a voice from the speaker 52, which is shown in FIG. 1. A notification of the present range may constantly be given through vibrations and not just when the driver's hand touches the shift lever 12.

When the operation of the shift lever 12 is an unintentional one, a warning may be given through a voice from the speaker 52, which is shown in FIG. 1.

The preferred embodiment may be applied to a held type shift-by-wire shift device.

The preferred embodiment may be applied to a column type shift device.

The preferred embodiment may be applied to a shift device that has a track ball structure or a touch structure. The preferred embodiment may also be applied to a shift device that has a rotary structure.

What is claimed is:

1. A shift device having a plurality of shift ranges, wherein the shift device sets a predetermined range from the plurality of shift ranges, the shift device comprising:
   a shift lever for setting the predetermined shift range;
   a control circuit connected to the shift lever for determining whether an operator has unintentionally operated the shift lever;
   a notification device connected to the control circuit for notifying the operated that the operator has unintentionally operated the a shift lever in accordance with the determination of the control circuit;
   a permanent magnet arranged on a distal end of the shift lever; and
   a plurality of electromagnets, each of said plurality of electromagnets arranged to face the permanent magnet in accordance with the shift range;
   wherein the control circuit magnetizes at least one of the electromagnets so that the at least one of the electromagnets has the same polarity as the permanent magnet when the shift lever is operated; and
   wherein the control circuit determines that the operation of the shift lever is an unintentional operation when the shift lever is operated against a repulsive force that is generated between the permanent magnet and the magnetized at least one of the electromagnets.

2. The shift device according to claim 1, wherein the control circuit provides an invalidation signal when determining that the shift lever has been unintentionally operated.

3. The shift device according to claim 1, wherein the notification device is a speaker.

4. The shift device according to claim 1, further comprising:
   a plurality of magnetic sensors connected to the control circuit and arranged so that each of the magnetic sensors faces one of the electromagnets;
   wherein each magnetic sensor detects a position of the permanent magnet and generates a position signal; and
   wherein the control circuit magnetizes at least one of the electromagnets in accordance with the position signal.

5. The shift device according to claim 4 wherein the magnetized at least one of the electromagnets exclude electromagnet associated with the set shift range.

6. A shift device having a plurality of shift ranges, wherein the shift device sets a predetermined range from the plurality of shift ranges, the shift device comprising:
   a shift lever for setting the predetermined shift range;
   a control circuit connected to the shift lever for determining whether an operator has unintentionally operated the shift lever; and
   a notification device connected to the control circuit for notifying the operator that the operator has unintentionally operated the shift lever in accordance with the determination of the control circuit, wherein;
   the shift lever includes a detection device for detecting whether the shift lever has been touched by the operator;
   the notification device has a motor for vibrating the shift lever; and
   the control circuit vibrates the motor in accordance with each shift range when the detection device detects that the operator has touched the shift lever.

7. The shift device according to claim 6, wherein:
   at least one of the shift ranges has plurality of gears; and
   the control circuit vibrates the motor in accordance with each gear when the detection device detects that the operator has touched the shift lever.

8. A shift device provided in a vehicle having an engine, wherein the shift device has a plurality of shift ranges and sets a predetermined range from the plurality of shift ranges, the shift device comprising:
   a velocity sensor for detecting a velocity of the vehicle and generating a velocity signal;
   an engine speed sensor for detecing an engine speed of the engine and generating an engine speed signal;
   a shift level for setting the predetermined shift range;
   a permanent magnet arranged on a distal end of the shift lever;
   a plurality of electromagnets, each arranged to face the permanent magnet in accordance with the shift range;
   a plurality of magnetic sensors, each arranged to face one of the electromagnets, wherein each magnetic sensor detects a position of the permanent magnet and generates a position signal;
   a control circuit connected to the velocity sensor, the engine speed sensor, the electromagnets, and the magnetic sensors for determining whether the shift lever has been operated unintentionally by the operator in accordance with the velocity signal, the engine speed signal, and the position signal; and a notification device connected to the control circuit for notifying the operator that the shift lever has been unintentionally operated when the control circuit determines that the shift lever has been unintentionally operated by the operator.

9. The shift device according to claim 8, wherein:

the control circuit magnetizes at least one of the electromagnets in accordance with the position signal so that the at least one of the electromagnets has the same polarity as the permanent magnet and wherein the control circuit determines that the operator has unintentionally operated the shift lever when the shift lever is operated against a repulsive force that is generated between the permanent magnet and the magnetized at east one of the electromagnets.

10. The shift device according to claim 9 wherein the magnetized at least one of the elctromagnets exclude the electromagnet associated with the set shift range.

* * * * *